(12) United States Patent
Han et al.

(10) Patent No.: US 10,732,480 B2
(45) Date of Patent: Aug. 4, 2020

(54) TRANSPARENCY AND COLOR TUNABLE ELECTRO-OPTICAL DEVICE USING COLLOIDAL CORE/SHELL NANOPARTICLES

(71) Applicant: Lawrence Livermore National Security, LLC, Livermore, CA (US)

(72) Inventors: Jinkyu Han, San Ramon, CA (US); Megan Carey Freyman, Livermore, CA (US); Thomas Han, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 18 days.

(21) Appl. No.: 15/636,513

(22) Filed: Jun. 28, 2017

(65) Prior Publication Data

US 2019/0004390 A1    Jan. 3, 2019

(51) Int. Cl.

| G02B 26/00 | (2006.01) |
|---|---|
| G02F 1/17 | (2019.01) |
| C09K 11/02 | (2006.01) |
| C09K 11/60 | (2006.01) |
| C09K 11/56 | (2006.01) |
| G02F 1/167 | (2019.01) |
| G02F 1/1675 | (2019.01) |

(52) U.S. Cl.
CPC ............ *G02F 1/172* (2013.01); *C09K 11/025* (2013.01); *C09K 11/562* (2013.01); *C09K 11/602* (2013.01); *G02F 1/167* (2013.01); *G02F 2001/1678* (2013.01); *G02F 2202/36* (2013.01)

(58) Field of Classification Search
CPC .... G02B 5/282; G02B 6/3572; G02B 26/004; G02B 6/351; G02B 6/3514; G02B 6/3522; G02B 6/353; G02B 6/3538; G02B 6/355; G02B 6/3552; G02B 6/357
USPC ................ 359/237, 242, 265–267, 270–273, 359/290–292, 295, 296, 298, 315, 322
See application file for complete search history.

(56) References Cited

U.S. PATENT DOCUMENTS

| 4,261,653 A | 4/1981 | Goodrich |
| 5,650,872 A | 7/1997 | Saxe et al. |
| 6,271,898 B1 * | 8/2001 | Clikeman ............ C09K 19/544 349/86 |
| 6,346,357 B1 * | 2/2002 | Pan ........................ G03G 9/125 430/115 |
| 6,936,193 B2 | 8/2005 | Saxe et al. |
| 2008/0291526 A1 * | 11/2008 | Lin ........................ G02F 1/167 |

(Continued)

OTHER PUBLICATIONS

Baetens et al., "Properties, Requirements and Possibilities of Smart Windows for Dynamic Daylight and Solar Energy Control in Buildings: A State-of-the-Art Review," Solar Energy Materials and Solar Cells, vol. 94, 2010, pp. 87-105.

(Continued)

*Primary Examiner* — Brandi N Thomas
(74) *Attorney, Agent, or Firm* — Zilka-Kotab, P.C.

(57) ABSTRACT

According to one embodiment, a product is a mixture including a solvent and generally spherical colloidal nanoparticles, the colloidal nanoparticles each having a core and a shell surrounding the core, and an electrode. In addition, the mixture is characterized as having a transparency to light in a predetermined wavelength range, where the transparency increases as a voltage of the electrode increases.

26 Claims, 8 Drawing Sheets

(56) References Cited

U.S. PATENT DOCUMENTS

| | | | | |
|---|---|---|---|---|
| 2013/0222404 A1* | 8/2013 | Chiu | ...................... | G09G 3/344 345/545 |
| 2013/0239791 A1* | 9/2013 | Cho | ........................ | F41A 21/00 89/14.7 |
| 2015/0070626 A1* | 3/2015 | Kim | ........................ | H01L 33/08 349/64 |
| 2017/0015854 A1* | 1/2017 | Shimizu | ................. | C09D 11/00 |
| 2018/0080823 A1* | 3/2018 | Bae | ........................... | G01J 3/12 |

OTHER PUBLICATIONS

Toyotama et al., "Thermally Driven Unidirectional Crystallization of Charged Colloidal Silica," Journal of the American Chemical Society, vol. 129, Feb. 22, 2007, pp. 3044-3045.
Beer, "Bestimmung Der Absorption Des Rothen Lichts in Farbigen Flüssigkeiten," Annalen der Physik, 1852, pp. 78-88.
Lee et al., "Energy and visual comfort performance of electrochromic windows with overhangs," Building and Environment, vol. 42, 2007, pp. 2439-2449.
McCartney, E. J., Optics of the Atmosphere: Scattering by Molecules and Particles, Physics Today, vol. 30, No. 5, 1976, pp. 76-77.
Vergaz et al., "Electrooptical behaviour and control of a suspended particle device," Opto-Electronics Review, vol. 15, 2007, pp. 154-158.
Hsu et al., "Nanograin crystalline transformation enhanced UV transparency of annealing refined indium tin oxide Film," Applied Physics Letters, vol. 94, 2009, pp. 231906-1-231906-3.
Asuka et al., "Homogeneously Dispersed Poly (Propylene)/Sio2 Nanocomposites with Unprecedented Transparency," Macromolecular Rapid Communications, 2006, pp. 910-913.
Zheng et al., "Quasicubic a-Fe2O3 Nanoparticles with Excellent Catalytic Performance," The Journal of Physical Chemistry B, vol. 110, Jan. 31, 2006, pp. 3093-3097.
Stober et al., "Controlled Growth of Monodisperse Silica Spheres in the Micron Size Range," Journal of Colloid and Interface Science, vol. 26, 1968, pp. 62-69.
Han et al., "Tunable Amorphous Photonic Materials with Pigmentary Colloidal Nanostructures," Advanced Optical Materials, vol. 1600838, 2017, pp. 1-9.
International Search Report and Written Opinion from PCT Application No. PCT/US18/29216, dated Jul. 16, 2018.
Han et al., "Tunable Amorphous Photonic Materials with Pigmentary Colloidal Nanostructures," Lawrence Livermore National Laboratory, Advanced Optical Materials, Dec. 16, 2016, 37 pages.
Panday, A., "Electrostatic Confinement, Patterning and Manipulation of Charged Nanoparticles by Combining Nanostructured Surfaces and Ionic Charge Regulation," Dissertation, The University of Michigan, 2016, 79 pages.
Pubchem, "Propylene Carbonate," PubChem, Open Chemistry Database, Compound Summary for CID 7924, Mar. 26, 2005, 47 pages.
International Preliminary Report from PCT Application No. PCT/US2018/029216, dated Jan. 9, 2020.

* cited by examiner

TRANSPARENCY AND COLOR TUNABLE ELECTRO-OPTICAL DEVICE USING COLLOIDAL CORE/SHELL NANOPARTICLES

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to tunable transparency in electro-optical devices, and more particularly, this invention relates to electro-optical devices using core/shell nanoparticles.

BACKGROUND

Motivated by the potential for significant energy savings from reduced cooling and heating loads, smart window technology has become significant in design and outfitting of commercial and residential buildings as well as in the automotive industry. In particular, smart glass using a suspended particle device (SPD) adapted for controlling the transmission of radiation would provide benefits in instant and precise light control, long lifetime, and cost-effectiveness. Such devices have numerous applications, for example, architectural windows for commercial buildings and residences, windows for automotive vehicles, boats, trains, planes and spacecraft, electronic displays, filters for lamps, cameras, windows, sunroofs, toys, sun-visors, and eyeglasses.

Current conventional techniques to fabricate SPD-based smart windows use one-dimensional needle or rod shaped dichroic materials whose alignment enables the light to pass through in the presence of applied electric field. However, the conventional technology does not provide tunability to colorations accompanied with transparency or translucence. Moreover, the choice of materials for use in conventional SPD-based smart windows is limited due to the difficulty of fabrication of rod-shaped materials with dichroic properties.

Thus, it would be desirable to improve the versatility and functionality of SPD-based smart windows. Moreover, it would be desirable to develop a novel method to tune the transparency of the smart glass window without loss in performance.

SUMMARY

Embodiments described herein demonstrate the use of colloidal core/shell nanoparticles (for example, with controlled size, shape and size distributions) suspended in highly dielectric liquid media as electric responsive SPD materials. Various embodiments described herein reveal a path for color tunable and/or transparency-controlled smart window and electronic display technology.

According to one embodiment, a product is a mixture including a solvent and generally spherical colloidal nanoparticles, the colloidal nanoparticles each having a core and a shell surrounding the core, and an electrode. In addition, the mixture is characterized as having a transparency to light in a predetermined wavelength range, where the transparency increases as a voltage of the electrode increases.

According to another embodiment, a product includes a plurality of generally spherical colloidal nanoparticles each having a core and a shell surrounding the core.

In yet another embodiment, a method includes applying a voltage to an electrode of a cell containing a mixture comprising a solvent and generally spherical colloidal nanoparticles, each having a core and a shell surrounding the core, for increasing a transparency of the mixture.

Other aspects and advantages of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of an electro-optical device using colloidal core/shell nanoparticles and/or related systems and methods.

In one general embodiment, a product is a mixture including a solvent and generally spherical colloidal nanoparticles, the colloidal nanoparticles each having a core and a shell surrounding the core, and an electrode. In addition, the mixture is characterized as having a transparency to light in a predetermined wavelength range, where the transparency increases as a voltage of the electrode increases.

In another general embodiment, a product includes a plurality of generally spherical colloidal nanoparticles each having a core and a shell surrounding the core.

In yet another general embodiment, a method includes applying a voltage to an electrode of a cell containing a mixture comprising a solvent and generally spherical colloidal nanoparticles, each having a core and a shell surrounding the core, for increasing a transparency of the mixture.

A list of acronyms used in the description is provided below.
EPD Electrophoretic deposition
EtOH Ethanol
Fe$_2$O$_3$ Ferric oxide
FWHM Full width half maximum
ITO Indium tin oxide
IR Infrared
PVP Polyvinylpyrrolidone
SEM Scanning Electron Microscopy
SiO$_2$ Silicon dioxide, silica
SPD Suspended particle device
TEM Transmission Electron Microscopy
TEOS Tetraethyl orthosilicate
USAXS Ultrasmall-angle X-ray scattering
UV Ultraviolet
ZnS Zinc sulfide According to Mie scattering theory and Beer-Lambert law, the light scattering by particles and resulting transmittance is significantly affected by the particle size, concentration of particles, and the thickness of a device. Therefore, the ability of particles to absorb and transmit different kinds of light may depend on interparticle distance. Various embodiments described herein include an electric responsive mixture of colloidal core/shell nanoparticles dispersed in a liquid suspension medium and the properties associated with this mixture in the presence of an applied electric field.

In one embodiment, the ordered structure of particle arrangement relative to scattering light may affect the transparency of the mixture containing the particles. In some approaches, the ordered structure of the particle arrangement may resemble crystallinity of the ordered structure thereby resulting in transparency. In the absence of applied electric field, particles in suspension may have not only interparticle distances that are far apart, possibly farther than a visible wavelength, but also less ordered particle arrangement and therefore scatter more light. By applying an electric field, responsive particles move toward an electrode, become closer together and the interparticle distance becomes shorter relative to the amount of potential applied to the electrode. The particle arrangement may become more ordered, approaching crystallinity. Counterintuitive to conventional EPD methods in which an electric field results in formation of visible structure at the deposition electrode, various embodiments described herein demonstrate that in response to an applied electric field, nanoparticles organize in a particle arrangement at the deposition electrode and become transparent.

Furthermore, various embodiments take advantage of unique combinations of characteristics such as optimal particle size, size distribution, the spacing between the electrodes, and particle concentration. Each of these characteristics may play important roles in achieving efficient structural color as well as transparency tunable SPD. Thus, various embodiments described herein demonstrate tunable transparency in response to an electrical field by adjusting the particle arrangement (such as the crystallinity of structure) in fabricated SPD using inorganic colloidal nanoparticle with optimal size, optimal size distribution and optimal particle concentration. According to Bragg-Snell Law in Photonic Crystals, the optimal particle size to reflect or transmit the light in the visible range is highly affected by the refractive index of embodiments. Typically, the optimal particle size may be in the range from tens of nanometers to up to ~300 nm. Furthermore, the crystallinity of structure may be significantly affected by particle size distribution and particle concentration. For example, particle concentration of 5-30 wt % in solution with 5-10% of size distribution can be optimal to demonstrate tunable transparency. One skilled in the art, once armed with the teachings presented herein, would be able to determine optimal parameters for a given application of this technology without the need for undue experimentation.

Figure 1A:
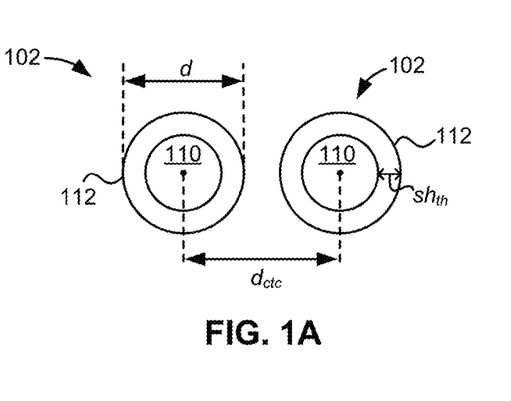
FIG. 1A is a schematic drawing of the cross-sectional view of a core/shell colloidal nanoparticle, according to one embodiment.

FIG. 1A depicts a core/shell nanoparticle 102, in accordance with one embodiment. As an option, the present nanoparticle 102 may be implemented in conjunction with features from any other embodiment listed herein, such as those described with reference to the other FIGS. Of course, however, such a product and others presented herein may be used in various applications and/or in permutations which may or may not be specifically described in the illustrative embodiments listed herein. Further, the product presented herein may be used in any desired environment.

In one embodiment, a product may include a plurality of generally spherical colloidal nanoparticles 102 each having a core 110 and a shell 112 surrounding the core 110, as illustrated in a cross-sectional view in FIG. 1A. The term "generally spherical" means the nanoparticles 102 have an average diameter that does not vary by more than a ratio of 1:2 from shortest to longest dimension and ideally not more than 1:1.5.

In some embodiments, the core particles may be light absorbing or reflecting in selected regions of the electromagnetic spectrum. Core particles with band gap ($E_g$) range from 1.8 eV to 3.1 eV can absorb and reflect the visible light. These materials can be CdS, CdSe, $Fe_2O_3$, $WO_3$, and GaP. When the core particles absorb in one region of the light, they appear with complimentary color by the light reflection. For example, violet light absorbing core particles such as CdS can reflect the yellow light. When core particles with larger band gap ($E_g$>3.2 eV) such as ZnO, ZnS, $TiO_2$, and $SiO_2$, all the light in the visible range can be not absorbed but reflected. Furthermore, core particles composed of $Cr^{3+}$, $Cu^{2+}$, and $Co^{2+}$ compounds such as $Cr_2O_3$ (green), CuO (green) and $Al_2CoO_4$ (blue) can also reflect the light in the visible range by inter-atomic excitation.

In an exemplary embodiment, the core of the nanoparticle may include a pigmentary material, for example, a highly faceted single crystal α-$Fe_2O_3$, that may enhance the color contrast with pigment-induced absorption.

In one embodiment, at least some of the cores 110 of the colloidal nanoparticles 102 may be light emitting, e.g., may have a known light emitting material therein. For example, but not limited to, at least some of the cores 110 of the colloidal nanoparticles 102 may exhibit photoluminescence. In some approaches, the core of the core/shell colloidal nanoparticle may include rare earth activated phosphor.

In various embodiments, at least some of the cores 110 may include a colorant, for example, but not limited to, a dye, a pigment, etc., may be applied to a base material of the cores 110. In other approaches, the base material of the core 110 may be selected to provide a color.

In some embodiments, the shell 112 that surrounds the core 110 of the nanoparticle 102 may be silicon-based. In some approaches, the shell 112 may have a negative charge, and include materials such as silica, titanium, etc. For example, according to Stöber method, which is an example of sol-gel process, negatively charged $SiO_2$ shells can be fabricated by the hydrolysis and condensation process of tetraethyl orthosilicate (TEOS) (i.e. silica precursors) in the presence of water and ammonia. In other approaches, the shell 112 may have a positive charge by the surface modification using silane coupling agents.

In some embodiments, the shell may improve the suspension properties of the colloidal nanoparticles in the solvent. According to various embodiments, the shell thickness $sh_{th}$ may affect the interparticle distance that may be defined by the core-to-core distance $d_{ctc}$ between adjacent nanoparticles. In some embodiments, the interparticle distance may be referred to as the intercore distance. In one embodiment, the shell 112 may control the distance $d_{ctc}$ between the cores of neighboring colloidal nanoparticles, as indicated on FIG. 1A. In some approaches, the shell may control the ordering of the colloidal nanoparticles.

In an exemplary embodiment, nanoparticles with a shell 112 having a thin shell thickness $sh_{th}$ may have a shorter interparticle distance $d_{ctc}$ than nanoparticles 102 with a shell 112 having a thicker shell thickness $sh_{th}$. Thus, the shell thickness $sh_{th}$ of the nanoparticles 102 may define the interparticle distance $d_{ctc}$ between the nanoparticles 102 of a concentration of nanoparticles 102 in a mixture 106 and, thereby determine the reflectance and structural color of the mixture 106 during assembly of the nanoparticles 102 with an applied electric field V.

In various embodiments, the shell properties of the colloidal nanoparticles may be tuned for different applications. In some approaches, the shell may have hydrophobic properties. In other approaches, the shell may have hydrophilic properties.

In an exemplary embodiment, the shell of the nanoparticle may include a $SiO_2$ coating that may improve the suspension properties and control the intercore distances, as indicated by $d_{ctc}$ in FIG. 1A. A shell of silica material may contribute to the structural colors. Moreover, the surface charge of $Fe_2O_3$ core particles with a $SiO_2$ shell ($Fe_2O_3$/$SiO_2$ nanoparticles) may be negative due to the ionization of the surface hydroxyl groups of the $SiO_2$ shell. Thus, negatively charged $Fe_2O_3$/$SiO_2$ nanoparticles may assemble in an ordered pattern as the particles concentrate on the positive electrode under an external electric field, resulting in structural color changes.

According to an exemplary embodiment, the assembly and tuning of $Fe_2O_3$/$SiO_2$ core/shell nanoparticle arrays allow the generation of tunable structural colors with distinct reflected and transmitted color behaviors. The use of $Fe_2O_3$/$SiO_2$ core/shell nanoparticles with a moderate polydispersity (for example, δ≈7%, as may be confirmed by synchrotron-based ultrasmall-angle X-ray scattering (USAXS)), along with a variation in the shell thickness and/or particle concentration may provide multiple pathways to tune the color spectrum of the assembly of nanoparticles. In some approaches, the color tunability observed by varying the concentrations may also be emulated by modulating the electric field applied to a diluted suspension of particles inside an electrophoretic deposition (EPD) cell.

In various embodiments, the nanoparticles 102 may have an average diameter d, as shown in FIG. 1A, in a range of about 50 to about 200 nanometers. In an exemplary embodiment, the nanoparticles 102 may have an average diameter d in a range of about 100 to about 150 nanometers.

Figure 1B:
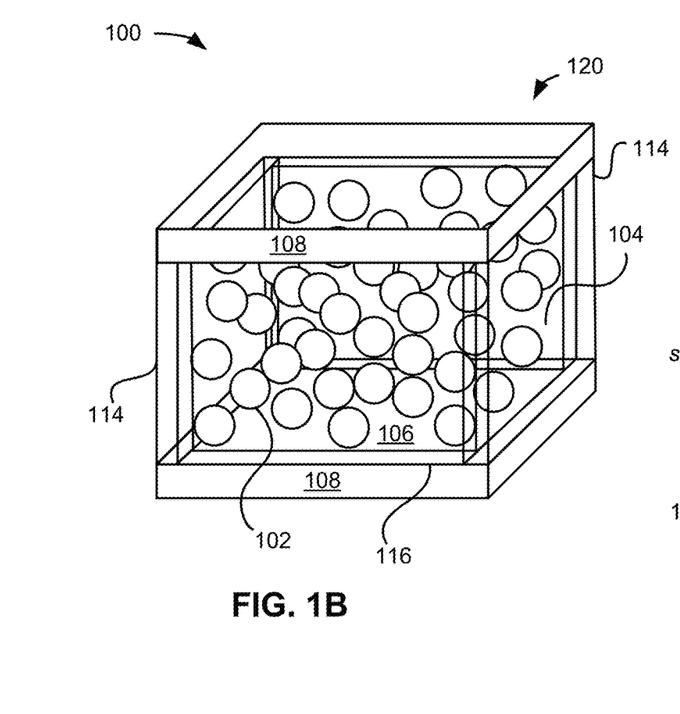
FIG. 1B is a schematic drawing of a suspended particle device with colloidal nanoparticles in the absence of an applied electrical field, according to one embodiment.
Figure 1C:
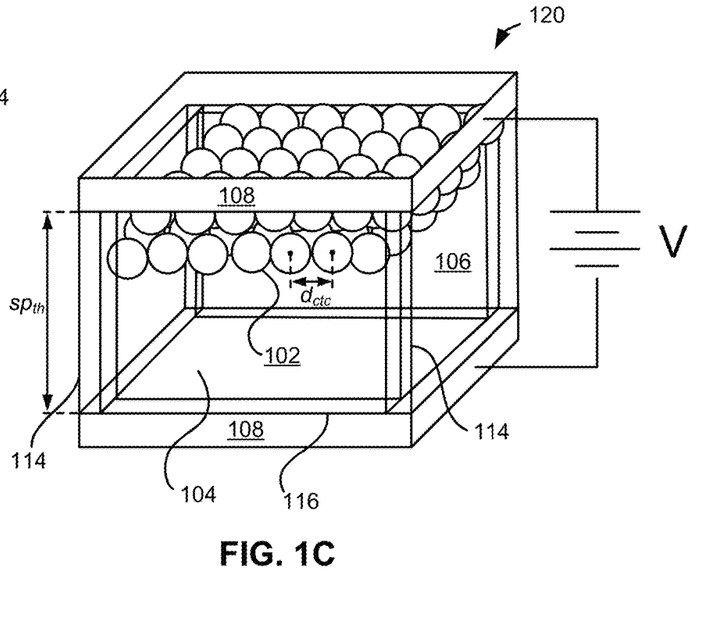
FIG. 1C is a schematic drawing of a suspended particle device with colloidal nanoparticles in the presence of an applied electrical field, according to one embodiment.

FIGS. 1B-1C depict a product of an electro-optical device with a plurality of such core/shell nanoparticles, in accordance with one embodiment. As an option, the present product 100 may be implemented in conjunction with features from any other embodiment listed herein, such as those described with reference to the other FIGS. Of course, however, such a product 100 and others presented herein may be used in various applications and/or in permutations which may or may not be specifically described in the illustrative embodiments listed herein. Further, the product 100 presented herein may be used in any desired environment.

In one embodiment as shown in FIGS. 1B and 1C, a product 100 includes a mixture 106 of a solvent 104 and generally spherical colloidal nanoparticles 102.

The solvent 104 in the mixture 106 may be a polar solvent. In various embodiments, the solvent (i.e. suspending medium) may be chosen as to maintain the suspended colloidal nanoparticles in gravitational equilibrium. In some embodiments, the solvent may provide electrochemical stability with a dielectric constant greater than about 30 and may have a boiling point greater than about 150 degrees Celsius. For example, but not limited to, the solvent 104 may include propylene carbonate, dimethylformamide, dimethyl sulfoxide, etc. In some approaches, the suspension of colloidal nanoparticles may be enhanced by a liquid suspending medium includes one or more non-aqueous, electrically resistive liquids with high dielectric constants.

The product 100, according to one embodiment, also includes an electrode 108. According to one embodiment, as shown in FIGS. 1B and 1C, an electrode 108 may be positioned on either end of a cell 120 with spacers 114, 116 in between the electrodes 108. The mixture 106 of solvent 104 and spherical colloidal nanoparticles 102 may be contained between the electrodes 108 and spacers 114, 116. In the cell 120, a voltage V may be applied to the electrodes 108.

In some embodiments, the electrodes 108 may be transparent of at least 90% light transmission (for example, but not limited to, not opaque, translucent, etc).

In various embodiments, the thickness of the cell that contains the mixture 106 may be defined by the thickness $sp_{th}$ of the spacers 114 that are positioned between the electrodes 108. The path of light through the electrodes 108 (the electrodes may be transparent) may determine not only the reflected color of the cell by controlling the relative intensity of structural and pigmentary colors of the mixture of colloidal nanoparticles in dielectric solvent but also the light transmissivity. In one embodiment, the reflected color and the light transmissivity may be tuned by the spacer thickness $sp_{th}$ that defines the cell thickness between the electrodes 108. As an example but not limiting to the embodiments described herein, the reflected colors as well as the light transmittance observed in the absence and presence of applied voltage under same electric field with a spacer thickness $sp_{th}$ of 500 μm spacing may be significantly different from the reflected colors and the light transmittance observed with a spacer thickness $sp_{th}$ of 25 μm spacing under the same conditions of electric field. The difference in reflected colors between the two thicknesses may be due to enhanced relative intensity of pigmentary color and possibly different response of the mixtures in each cell to electric stimuli. Furthermore, the difference in transmissivity between the two thicknesses may be due to higher scattering events in thicker cell thereby reducing the transmission of the incident light.

According to an exemplary embodiment, the photonic color of a mixture with a 500 μm spacing between the electrodes may change from yellow to pink and then to deep red as the applied voltage increases. Some embodiments demonstrate the versatility of the EPD cell device which may be used to generate the full visible color spectrum via changing the spacer thickness, particle concentration, silica shell thickness ($sh_{th}$ of $SiO_2$), and applied voltage.

According to one embodiment, the product 100 may include least one spacer 114 (for example, barrier, gasket, etc) for forming a chamber having sides defining an interior. Moreover, the mixture 106 may be in the interior of the chamber.

FIGS. 1B and 1C show schematic drawings of fabricated three-layered SPD cell 120 that includes the colloidal nanoparticle suspension layer between transparent top and bottom electrodes. In some approaches, the electrodes 108 may be transparent indium tin oxide (ITO) glass or poly(ethylene terephthalate) electrodes. FIG. 1B shows the cell 120 with a mixture 106 in the absence of applied voltage ("off" state). The colloidal nanoparticles 102 may remain in suspension in the solvent 104. In various embodiments, the mixture 106 may have reduced transparency of no greater than 10% light transmission (for example, opaque, not translucent, etc), when there is no voltage applied to the electrode 108. In the absence of applied electrical field, colloidal nanoparticles in the liquid suspension are likely located in random positions due to Brownian motion or the particles in the suspension may be arranged with weak correlation to each other.

FIG. 1C shows a schematic of the cell 120 with a mixture 106 in the presence of applied voltage V ("on" state). As shown, colloidal nanoparticles can be assembled on the positive electrode under an external electric field due to their negative surface charge resulting in transparency of at least 90% light transmission. Moreover, assembling of colloidal nanoparticles during applied electrical field may result in structural color changes. The resulting nanoparticle arrangements that results in transparency and/or color change may occur from the balance between the electrostatic repulsion between the particles and the assembly of colloidal particles at the electrode in the presence of an electric field.

In some embodiments, the mixture 106 may create a different between transmitted and reflected colors in the cell 120 with applied electric field. In an exemplary embodiment, the behavior of the mixture of colloidal $Fe_2O_3/SiO_2$ nanoparticles in dielectric solvent may give rise to behavior comparable with the Lycurgus cup effect, in which the transmitted and reflected colors in the cell is attributed to the difference between the pigmentary color (intrinsic color) of $Fe_2O_3/SiO_2$ and the structural color from $Fe_2O_3/SiO_2$ nanoparticle arrangement.

Without wishing to be bound by any theory, the inventors believe the transparency change may be obtained more clearly in a device with mono-dispersed particles with a spherical shape because there is a reduction of the scattering centers such as pores and grain boundaries when these particles are concentrated in the presence of an electrical field. Furthermore, it appears the increased transparency may be attributed to an enhanced crystallinity of nanoparticle arrangement. In the presence of an electric field, the nanoparticle structure may have enhanced crystallinity and periodic arrangement, thereby increasing the transparency as compared with the random or less ordered particle structure in the absence of an electric field. Furthermore, the defects (e.g., scattering centers) such as pores and grain boundary in the structure appear to be reduced by densification of colloidal nanoparticles at a larger electric field.

In various embodiments, the core/shell colloidal nanoparticles may be suspended in highly dielectric liquid media with optimal concentration for electrical responded color and transparency tunable device. In the presence of an applied electrical field, the colloidal nanoparticles may assemble and generate a transparency in the suspension thereby creating an optical stop and pass band.

In one embodiment, light-emitting core/shell colloidal nanoparticles have enhanced light-emitting properties as the core/shell colloidal nanoparticles may undergo light transparency structural behavior in a SPD device in the presence of applied electrical field. In some approaches, application of the electric field causes the light-emitting nanoparticles to assemble, and thereby may enhance the light-emitting properties of the nanoparticles (such as the light emitting from the device becomes brighter).

In some embodiments, the mixture 106 may be characterized as having a transparency that increases as a voltage V of the electrode 108 increases. The transparency to light may occur in a predetermined wavelength range. In some approaches, the predetermined wavelength range may be in the visible region. In other approaches, the predetermined wavelength range may be in the UV range. In yet other approaches, the predetermined wavelength range may be in the infrared (IR) range.

In some embodiments, the core/shell colloidal nanoparticle may be tuned to a predetermined wavelength region in the presence of applied electric field. In some approaches, the size of the nanoparticle core may be tuned to a predetermined wavelength. In other approaches, the thickness of the shell may be tuned to a predetermined wavelength. In yet other approaches, one or more of the characteristics of the core/shell colloidal nanoparticle may be tuned to a predetermined wavelength.

In some embodiments, the predetermined wavelength range may be only a portion of the wavelengths in the ultraviolet to infrared range. In some approaches, the transparency of the mixture may not significantly change for a second wavelength range in the ultraviolet to infrared range as the voltage of the electrode increases. The second wavelength range may not overlap the wavelength range for which a bandgap effect is desired. In some approaches, the second wavelength range may be within the predetermined wavelength range. In other approaches, the second wavelength range may be overlapping the predetermined wavelength range. In yet other approaches, the second wavelength range may be outside the predetermined wavelength range.

In an exemplary approach, there may be a less than 10% change in transparency of the mixture for a second wavelength range in the ultraviolet to infrared range as the voltage of the electrode increases. For example, but not limited to, a smart window may include a mixture of nanoparticles comprised of material that absorbs in the IR region that continually blocks thermal, radioactive heat (blocking incoming IR via absorbance) while changing to transparency as the voltage of the electrode increases (providing clarity of the window via transmittance of visible light). As another example, the smart window may include a mixture of nanoparticles comprised of material that absorbs in the UV region that continually blocks UV radiation (blocking incoming UV via absorbance, e.g. ZnS) while changing to transparency as the voltage of the electrode increases (providing clarity of the window via transmittance of visible light).

As an example, a smart window may have core/shell colloidal particles that includes energy absorbing material that absorbs in the IR range but allows visible light through, so the smart window has transparency while blocking IR light, and thereby reducing heat typically generated by IR light. In another example of a smart window, core/shell colloidal particles may include material that absorbs UV light (for example, $ZnS/SiO_2$), thereby allowing sunlight through a window while blocking harmful UV light. Thus, depending on the type of material, optical band gaps ranging from UV, visual to IR may be created.

In other embodiments, the mixture 106 may be characterized as having a transparency of at least 90% light transmission upon application of a predetermined voltage V to the electrode 108. In some approaches, the application of a predetermined voltage may increase the interparticle distance between the core/shell nanoparticles of the mixture. In other approaches, the application of a predetermined voltage may decrease the interparticle distance between the core/shell nanoparticles of the mixture.

In some embodiments, a color hue of the mixture 106 may change as the transparency changes as a voltage V of the electrode 108 changes.

In various embodiments, the colloidal nanoparticles 102 may migrate toward one side of the mixture 106 upon application of the voltage V to the electrode 108. In one embodiment of product 100 as shown in FIG. 1B, the colloidal nanoparticles 102 may migrate toward the electrode 108, depending on voltage and charge of the nanoparticle. In another embodiment, the colloidal nanoparticles 102 may migrate away from the electrode 108, depending on voltage and charge of the nanoparticle.

In various embodiments, turning the voltage off and thereby removing the applied electric field may reverse the change in transparency of the mixture 106 in the cell 120 that occurs in the presence of an applied electric field. In some approaches, turning the voltage off and thereby removing the applied electric field may reverse the color change of the mixture 106 in the cell 120 that occurs in the presence of an applied electric field. The color change and/or transparency change may be fully reversible. In some embodiments, the response time corresponding to applied voltage may be almost instantaneous.

Figure 2:
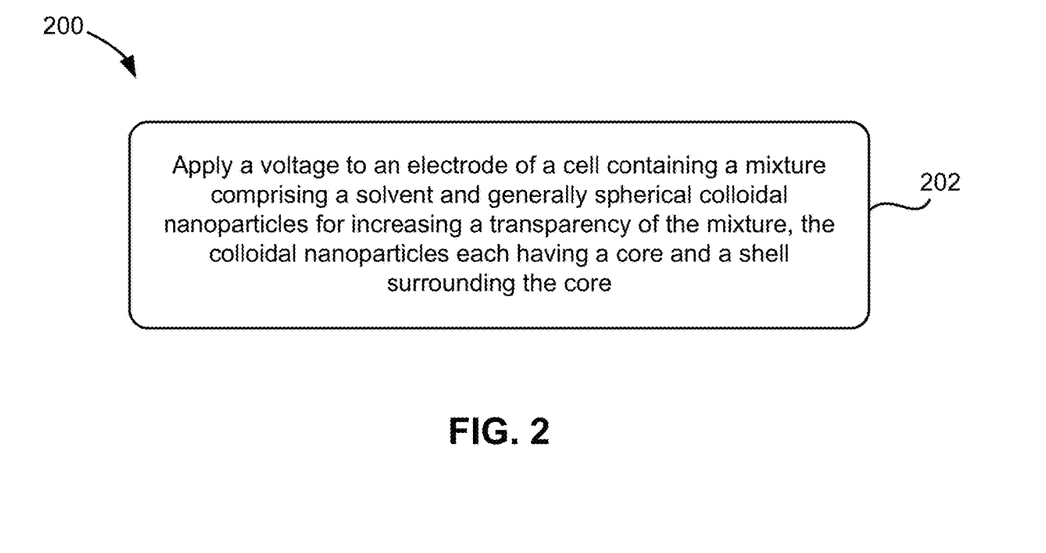
FIG. 2 is a flow chart of a method, according to one embodiment.

FIG. 2 shows a method 200 for applying a voltage to an electrode of a cell containing a mixture of colloidal nanoparticles for increasing a transparency of the mixture, in accordance with one embodiment. As an option, the present method 200 may be implemented to devices such as those shown in the other FIGS. described herein. Of course, however, this method 200 and others presented herein may be used to provide applications which may or may not be related to the illustrative embodiments listed herein. Further, the methods presented herein may be carried out in any desired environment. Moreover, more or less operations than those shown in FIG. 2 may be included in method 200, according to various embodiments. It should also be noted that any of the aforementioned features may be used in any of the embodiments described in accordance with the various methods.

According to one embodiment as shown in FIG. 2, a method 200 includes an operation 202 of applying a voltage to an electrode of a cell containing a mixture comprising a solvent and generally spherical colloidal nanoparticles for increasing a transparency of the mixture, the colloidal nanoparticles each having a core and a shell surrounding the core.

In one embodiment of the method 200, the colloidal nanoparticles may migrate toward one side of the mixture upon application of the voltage to the electrode. In one approach, at least one electrode is transparent.

In one embodiment of the method 200, the mixture may be characterized as having a transparency of at least 90% light transmission upon application of a predetermined voltage to the electrode.

In one embodiment, the method 200 includes the mixture having a specific color, where a concentration of the nanoparticles is selected to provide the specific color of the mixture. The mixture, in various embodiments, may be characterized as changing color across the visible spectrum in direct correlation to a concentration of the nanoparticles, rather than simply changing to a shade of the same color. Thus, the particular color of the mixture, e.g., in the absence of a voltage, can be selected by selecting a concentration of nanoparticles that provides the desired color.

Experimental Methods

Synthesis of $\alpha$-$Fe_2O_3$ Nanocubes and Nanoparticle Clusters and ZnS Nanoparticle Clusters:

$\alpha$-$Fe_2O_3$ nanocubes and nanoparticle clusters were prepared adopting a microwave assisted hydrothermal approach. Briefly, 1.8 g of PVP (Sigma-Aldrich, Mw=55 000) was added to 40 mL of N,N-dimethylformamide (Sigma-Aldrich, 99.8%) and stirred for 30 min to completely dissolve the reagents. Thereafter, 0.1 mmol of $Fe(NO_3)_3 \cdot 9H_2O$ (Sigma-Aldrich, >99.95%) was added in the solution, vigorously stirred for 15 min. Note that for the nanoparticle cluster synthesis, 0.1 ml nitric acid (Sigma-Aldrich, ACS reagent 70%) was further added in the solution and stirred for 10 min. Thereafter, the solution mixture was transferred into in a microwave oven (SPX-80 from CEM Corp., using single mode and continuous power at 2.45 GHz), and heated to 180° C. for 2 h.

In terms of ZnS nanoparticle synthesis, 1 g PVP was dissolved in 200 ml deionized water and the solution was heated to 80° C. Subsequently, 0.01 mol thioacetamide (Sigma-Aldrich, ACS reagent >99%) was added, followed by an addition of nitric acid (0.2 mL). Thereafter, 0.2 mol zinc nitrate hexahydrate (J. T. Baker, 99.0%) was added into the solution and stirred for 2 h and then removed to convectively cool to room temperature. As-prepared samples were later isolated from the mother liquor by centrifugation at 10,000 rpm for 20 min and washed with the mixture of water and ethanol (EtOH) (vwater:vEtOH=1:1) for three times and stored in EtOH for future use.

Synthesis of α-$Fe_2O_3$/$SiO_2$ and ZnS/$SiO_2$ Core/Shell Nanoparticles:

α-$Fe_2O_3$/$SiO_2$ and ZnS/$SiO_2$ core/shell colloids were prepared through a modified Stöber method. Typically, 20 mg of α-$Fe_2O_3$ nanocubes or α-$Fe_2O_3$ nanoparticles or ZnS nanoparticle clusters was added to 20 mL EtOH with 1 mL ammonium hydroxide (J. T. Baker, 28%) and 3 mL Mill-Q water and stirred vigorously for 10 min. 0.04 mL TEOS (Sigma-Aldrich, 99.999%) was added to the solution every 20 min for the desired time (e.g., 1-2 h) so the total volume of TEOS was 0.08-0.32 mL and stirred for another 0-22 h at room temperature. The obtained core-shell particles were washed with EtOH through repetitive centrifugation and redispersion. The nanoparticles were finally dispersed in propylene carbonate at greater than 5 wt % of $Fe_2O_3$/$SiO_2$ or ZnS/$SiO_2$, which was the critical concentration for exhibiting reflective structural color.

Fabrication of an EPD Cell and Patterned Ti—Pt Deposited Electrode: The $Fe_2O_3$/$SiO_2$ colloids were then injected between two indium tin oxide (ITO) electrodes (1 in.×1 in.) separated by a 25 μm spacer of kapton tape to investigate the electrophoretic response of structural color from $Fe_2O_3$/$SiO_2$ colloids in propylene carbonate.

Characterization:

SEM images were obtained at 3 kV on a JEOL JSM-7401F instrument (JEOL USA, Inc, 11 Dearborn Road, Peabody, Mass. 01960). Specimens for all microscopy experiments were prepared by dispersing the as-prepared product in EtOH, sonicating for 2 min to ensure an adequate dispersion of the nanostructures, and dipping one drop of the solution onto a Si wafer for SEM.

The zeta potential of the suspended particles was measured with a ZetaSizer Nano ZS90 (Malvern Instruments, Inc, Enigma Business Park, Grovewood Road, Malvern, Worcestershire, US WR14 1XZ).

The optical properties of $Fe_2O_3$/$SiO_2$ colloids in propylene carbonate were measured using a Perkin-Elmer Lambda 950 spectrophotometer (PerkinElmer, 520 South Main Street, Suite 2423, Akron, Ohio 44311, USA) equipped with an integrating sphere in the static state to examine the effect of concentration and silica shell thickness on the structural coloration. An Ocean Optics HR2000+ (Ocean Optics, Inc, 830 Douglas Avenue, Dunedin, Fla. 34698, USA) with a balanced tungsten source (400-900 nm) was used to investigate the effect of applied voltage on the coloration in an EPD cell and angle dependency of the structural color.

Experimental Results $Fe_2O_3$/$SiO_2$ and ZnS/$SiO_2$ Core/Shell Nanoparticles

Scanning electron microscopy (SEM) images of synthesized α-$Fe_2O_3$ and ZnS/$SiO_2$ core/shell nanoparticles as responsive materials are shown in FIGS. 3A-3D (scale bars=100 nm). The size of the core nanoparticles and the silica ($SiO_2$) shell was optimized for transparency.

Figure 3A:
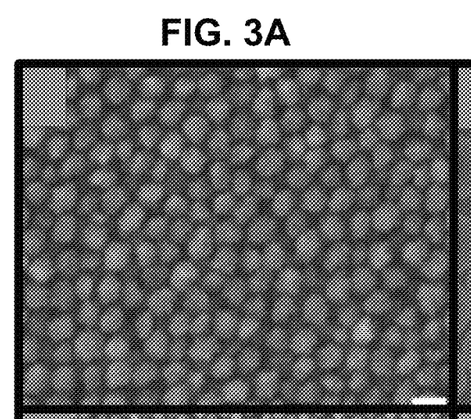
FIG. 3A is a scanning electron microscope (SEM) image of a ferric oxide ($Fe_2O_3$) nanoparticle clusters, according to one embodiment.
Figure 3B:
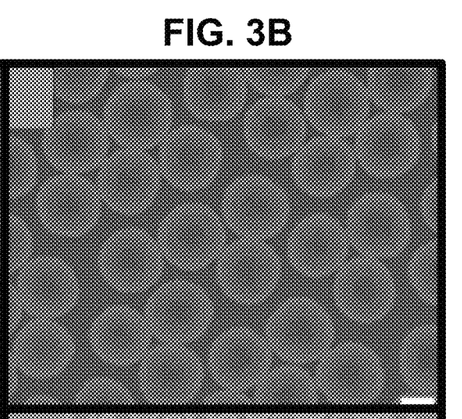
FIG. 3B is a SEM image of a $Fe_2O_3$/silicon dioxide ($SiO_2$) colloidal nanoparticles, according to one embodiment.
Figure 3C:
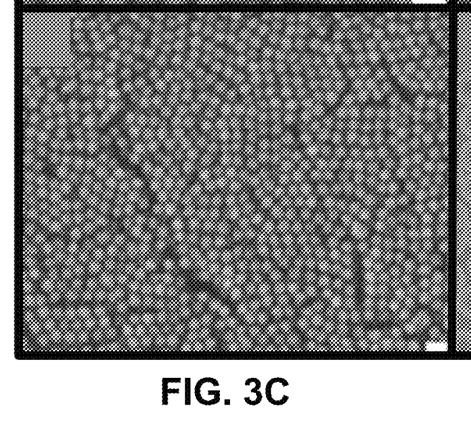
FIG. 3C is a SEM image of a zinc sulfide (ZnS) nanoparticle clusters, according to one embodiment.

FIGS. 3A and 3C show the SEM images of single crystalline α-$Fe_2O_3$ nanoparticle clusters (FIG. 3A) and single crystalline ZnS nanoparticle clusters (FIG. 3C), respectively. Based on SEM image analysis, the average diameter of the synthesized α-$Fe_2O_3$ and ZnS particles was 69.1±6.8 nm (polydispersity, δ=9.8%) and 61.4±4.1 nm (polydispersity, δ=6.7%), respectively.

Figure 3D:
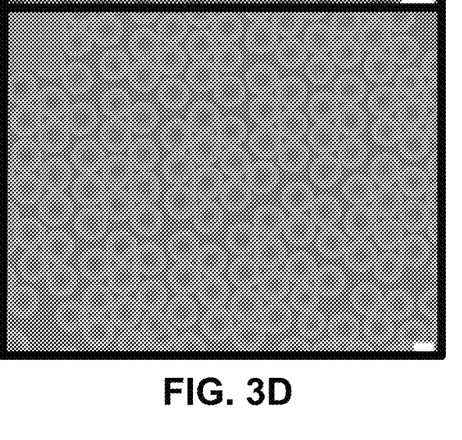
FIG. 3D is an SEM image of a $ZnS/SiO_2$ colloidal nanoparticles, according to one embodiment.

FIGS. 3B and 3D show silica coated α-$Fe_2O_3$ and ZnS nanoparticles, respectively, uniformly coated with silica shell thickness to improve the stability of the particle suspensions and to control the interparticle electrostatic interactions between the particles. It is noteworthy that poly(vinyl pyrrolidone) (PVP) ligands on the surface of α-$Fe_2O_3$ and ZnS nanoparticles may play an important role in formation of the silica coating on the these core nanoparticles, as the PVP ligands may act as anchoring sites for silica deposition. The surface charge on core/shell nanoparticles is negative due to the ionization of the surface hydroxyl groups of the $SiO_2$ shell. This negative surface charge on the particles has been confirmed by the observed zeta potential of −25.2 mV. The thickness of the silica shell ($sh_{th}$ of $SiO_2$) can be controlled from 16.5±3.2 to 42.0±3.8 nm with reaction time and concentration of TEOS precursor added during the reaction.

Tunability of Color of $Fe_2O_3$/$SiO_2$ Suspensions

The as-prepared suspensions of $Fe_2O_3$/$SiO_2$ colloids are solvent exchanged to propylene carbonate, upon which they self-assemble and generate structural ordering due to electrostatic repulsion between particles. Propylene carbonate was chosen as a solvent because it exhibits excellent electrochemical stability and low vapor pressure.

The characteristics of suspensions of nanoparticles with a core diameter of about 40 nm and a shell thickness of about 40 nm are shown in FIGS. 4 and 5A-5D.

Figure 4:
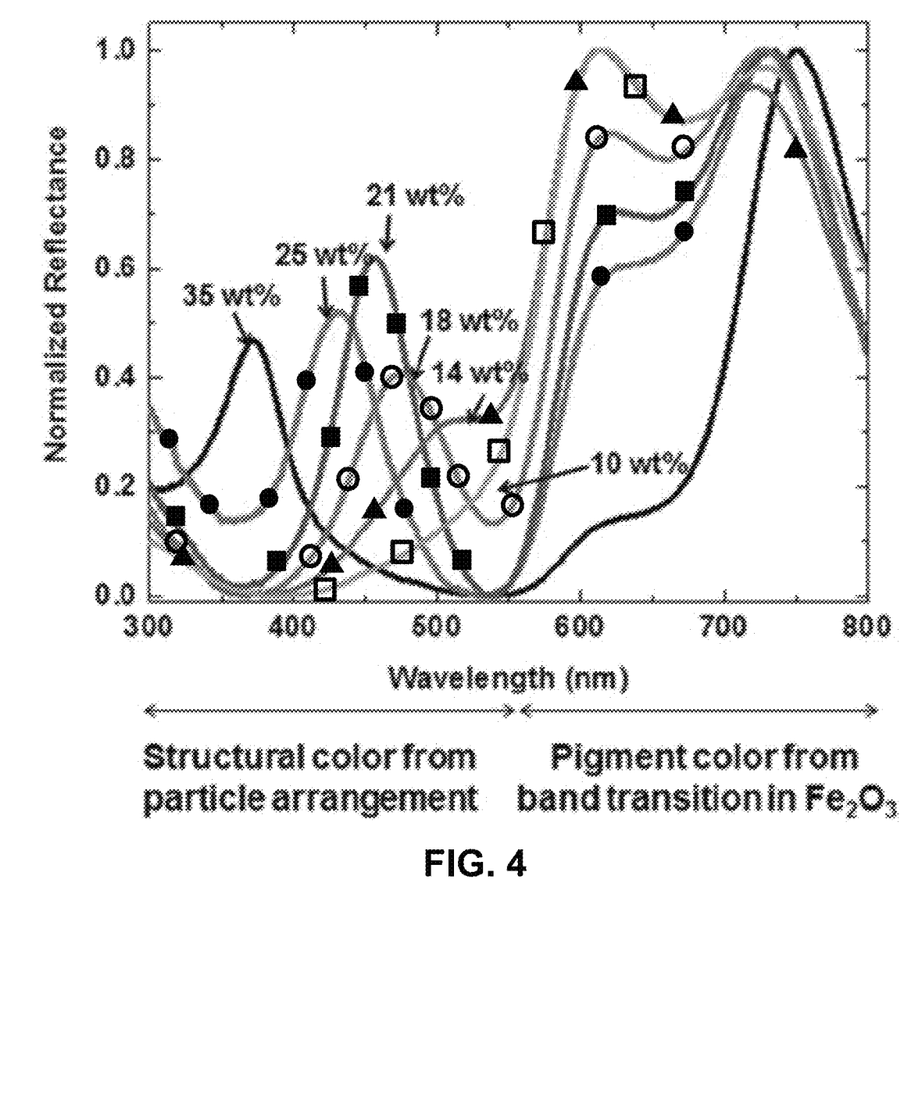
FIG. 4 is plot of reflectance versus wavelength that shows colored measured for different concentrations of $Fe_2O_3/SiO_2$ colloidal nanoparticles in suspension.

As shown in FIG. 4, the resulting ordered structures provided colors in both the visible and the UV spectrum regime that were tunable by controlling the particle concentrations (the minimum particle concentration to observe structural color for the α-$Fe_2O_3$/$SiO_2$ system was 5 wt %). The suspensions of $Fe_2O_3$/$SiO_2$ particles in propylene carbonate below 5 wt % concentration display the typical orange-red pigmentary colors of the $Fe_2O_3$ core, however, as the particle concentration increases, the suspensions exhibit yellowish-green reflective photonic color (11-16 wt %) and gradually evolve to purple and deep purple color at 21-35 wt %, indicating that the reflected color includes not only pigmentary but also structural colors. FIG. 4 shows the reflective spectra of $Fe_2O_3$/$SiO_2$ in propylene carbonate with different particle concentrations. The spectra confirmed that the observed reflected colors were produced by a combination of the structural color from $Fe_2O_3$/$SiO_2$ nanoparticle arrangement, observed in the range of 350-550 nm, and pigmentary color of $Fe_2O_3$, observed in the range of 550-800 nm. The pigmentary color of $Fe_2O_3$ was attributed to the transition of ground and first excited states of ferric iron ($d^5$ states) in the $Fe_2O_3$ crystal structure. The reflectivity spectrum of bare $Fe_2O_3$ nanocubes was characterized by a local reflectivity maximum near 730 nm, a shoulder centered near 610 nm assigned to $^6A_1 \rightarrow {}^4T_2$, and low reflectivity near 510 and 460 nm assigned to $^6A_1 \rightarrow ({}^4E, {}^4A_1)$ transition, which was consistent with the reflectivity of pure hematite α-$Fe_2O_3$, indicating that as-made $Fe_2O_3$ nanocubes have a single-phase hematite structure.

The structural photonic color produced by the self-assembled nanoparticle arrays blue-shifts as the particle concentration increases (18 wt %, 21 wt %, 25 wt %, 35 wt %), as shown in FIG. 4. This was mainly due to shorter interparticle distances between the $Fe_2O_3$/$SiO_2$ nanoparticles at higher nanoparticle concentrations. Indeed, the bandwidth of reflectance in a photonic crystal appears to be strongly correlated to the ordering and crystallinity of the particle arrangement and thus the structure of $Fe_2O_3$/$SiO_2$ particle arrays in suspension was likely more ordered as the particle concentration increased in the range of 5-35 wt %. Interestingly, the reflection intensity appears to be affected by the periodicity of nanoparticle assemblies. The reflection intensity increased with increasing particle concentration up to ≈21 wt % and then decreased with increasing particle concentration in 21-35 wt % as shown in FIG. 4. Without wishing to be bound by any theory, the inventors believe that at lower concentrations (for example, 10-21 wt %), the incident light is more likely to interact with particle arrays in suspension resulting in enhancement of reflection intensity as the periodicity and order of the structure (particle concentration) increases. The cause of reduction of reflection intensity above ≈21 wt % is unclear. However, without wishing to be bound by any theory, the inventors believe that the reduction may be attributed to the enhancement of transmittance in particle structures, when particle assemblies become nearly crystalline-like. In general, the transmittance increases with increasing order of the particle assemblies thereby reducing scattering events (such as, reflection). Thus, at higher concentration (>21 wt %), the enhancement of light transmission is likely more dominant as compared with that of reflection, thereby reducing overall reflection intensity.

Figure 5A:
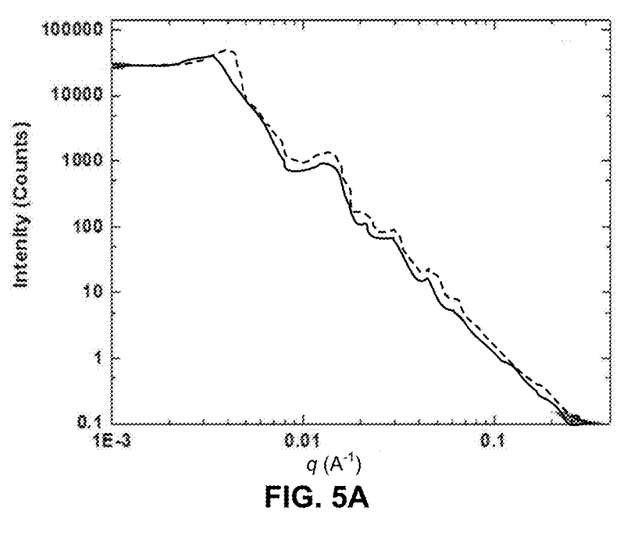
FIG. 5A is a plot of raw ultrasmall angle X-ray scattering (USAXS) data of $Fe_2O_3/SiO_2$ colloidal nanoparticles, according to one embodiment.

Structural Ordering and Interparticle Distance of $Fe_2O_3$/ $SiO_2$ Suspensions High fidelity examination of the structural ordering and interparticle distances of $Fe_2O_3/SiO_2$ suspensions with different particle concentrations was performed with USAXS measurements. USAXS provided a measurement of the structural correlation in nanostructured ensembles, which then could be used to understand the interactions of visible light with the nanostructural assembly. FIG. 5A displays raw x-ray scattering USAXS data of $Fe_2O_3/SiO_2$ nanostructures with 14 (dashed line) and 21 (solid line) wt % of $Fe_2O_3$ in propylene carbonate as a function of the scattering wave vector, q, on a log-log plot. Both curves show Porod behavior, where I(q) scales to $q^{-2.9}$ for $q>0.01$ $A^{-1}$ and the Porod slope (2.9) was consistent with a typical value of cubes. The existence of several minima for $q>0.1$ $A^{-1}$ indicated a moderate polydispersity. Based on modeling of the USAXS data, the $Fe_2O_3$ core nanoparticle mean diameter was 42.4 nm and polydispersity (δ) was 7%, with a shell thickness $sh_{th}$ of 39.5 nm, which was within experimental error of the values determined from TEM (d core, TEM=42.9 nm (δ=7%), $sh_{th}$ ($SiO_2$), TEM=42.0±3.8 nm).

In order to examine the interparticle interactions in the $Fe_2O_3/SiO_2$ nanoparticle system with different particle concentration in more detail, the structure factor S(q) was calculated by dividing I(q) with the form factor representing the specific size and shape of the scatters.

Figure 5B:
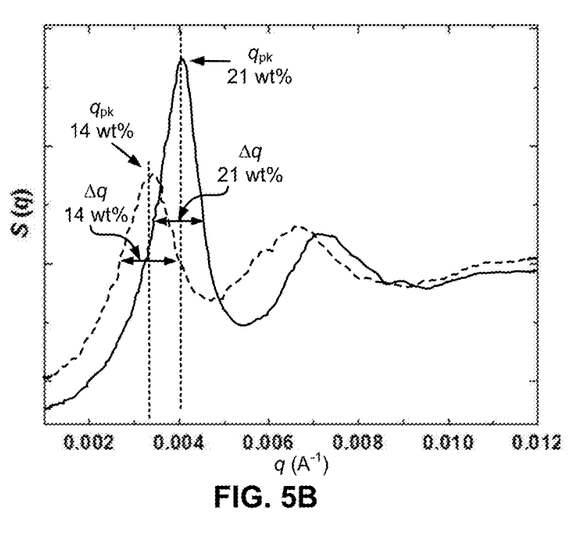
FIG. 5B is a plot of the structure factor of $Fe_2O_3/SiO_2$ suspensions obtained from raw data of FIG. 5A.
Figure 5C:
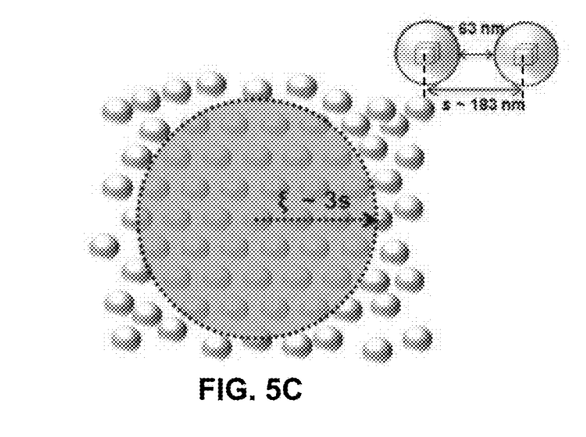
FIG. 5C is a schematic drawing of a plurality of $Fe_2O_3/SiO_2$ nanoparticles in a concentration of 14 wt % $Fe_2O_3$ with an inset schematic drawing of the interparticle distance at 14 wt % $Fe_2O_3$ concentration, according to one embodiment.
Figure 5D:
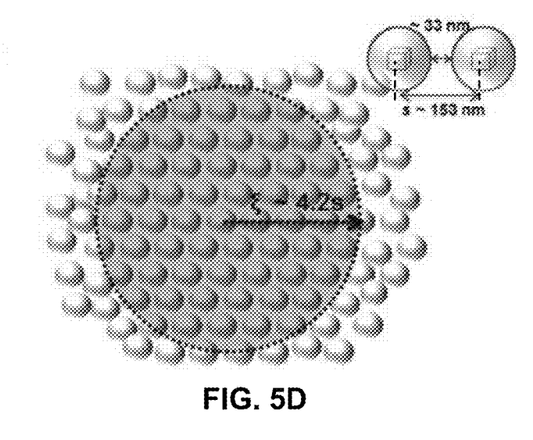
FIG. 5D is a schematic drawing of a plurality of $Fe_2O_3/SiO_2$ nanoparticles in a concentration of 21 wt % $Fe_2O_3$ with an inset schematic drawing of the interparticle distance at 21 wt % $Fe_2O_3$ concentration, according to one embodiment.

FIG. 5B shows a plot of the structure factor S(q) on a log-log plot. The structure factor S(q) at (0.001<q<0.01 $A^-$), which was relevant for visible structural color production. The S(q) profile for the nanoparticle structures with 14 wt % $Fe_2O_3$ (dashed line) shows an obvious peak at $q_{pk}$=0.00344 A. The S(q) profile for the nanoparticle structures with 21 wt % $Fe_2O_3$ (solid line) shows an obvious peak at $q_p$k=0.00410 $A^{-1}$. Using the peak position $q_p$k, the interparticle distance (spatial correlation length, s), estimated core-to-core distance $d_{ctc}$ (see FIG. 1A) was calculated by using $$s(q) = \frac{2\pi}{q_{pk}} \quad \text{Equation 1}$$

where s=182.65 nm ($q_{pk}$=0.00344 $A^{-1}$) for 14 wt % (FIG. 5C) and s=153.2 nm ($q_{pk}$=0.00410 $A^{-1}$) for 21 wt % (FIG. 5D). The range of both s values indicated that the presence of a dominant length scale of structural periodicity may be on the order of visible wavelength and as anticipated, the interparticle distance was shorter at higher nanoparticle concentration (FIG. 5D)

It was somewhat surprising that a relatively small difference of interparticle distance between 14 and 21 wt % (≈30 nm) gave rise to a significant blue-shift of color from green to purple (color not shown, but wavelength curves shown in FIG. 3). Looking to FIG. 5B, it is worth noting that both structures possessed a second peak at higher q=0.0067 $A^{-1}$ for 14 wt % (dashed line) and 0.0074 $A^{-1}$ for 21 wt %, (solid line), due to the structural correlation with primary $1^{st}$ peak. However, the correlation between $1^{st}$ and $2^{nd}$ peak of each structure most likely may be weak in both structures since the bandwidth of the second peak was broad and less distinctive than typically observed for a highly ordered structure. Thus, the without wishing to be bound by any theory, the inventors suggest that both structures may be far from perfectly ordered, for example, the structures may be amorphous structures.

In order to further demonstrate the crystallinity of the structures, the full width half maximum (FWHM) of the widths of the primary USAXS peak of each structure in FIG. 5B (Δq of 14 wt %, dashed line; Δq of 21 wt %, solid line) was used to quantify the extent of spatial periodicity, ξ

$$\xi = \frac{2\pi}{\Delta q} \quad \text{Equation 2}$$

ξ was 539.4 nm for 14 wt % and 636.6 nm for 21 wt %, which was consistent with the decreased bandwidth of the optical reflectance spectrum at 21 wt % (FWHM≈57 nm) as compared with the spectrum at 14 wt % (FWHM≈82 nm) in suspension (data not shown). For both cases, ξ was only a few times the dominant length scale of spatial correlations (s) (i.e., ξ=2.95 s for 14 wt % and =4.15 s for 21 wt %). As shown in FIG. 5C, the spatial periodicity for 14 wt % is shown as ξ~3 s, as shown in FIG. 5D, the spatial periodicity for 21 wt % is shown as ξ~4.2 s. These results implied that both structures possessed short-range order and were amorphous.

Schematic drawings of the nanoparticle arrangement for 14 and 21 wt % $Fe_2O_3/SiO_2$, based upon the structural information derived from the USAXS, are shown in FIGS. 5C and 5D, respectively.

Transparency of the Device Using $Fe_2O_3$/ $SiO_2$ Nanoparticles in Suspension

Figure 6A:
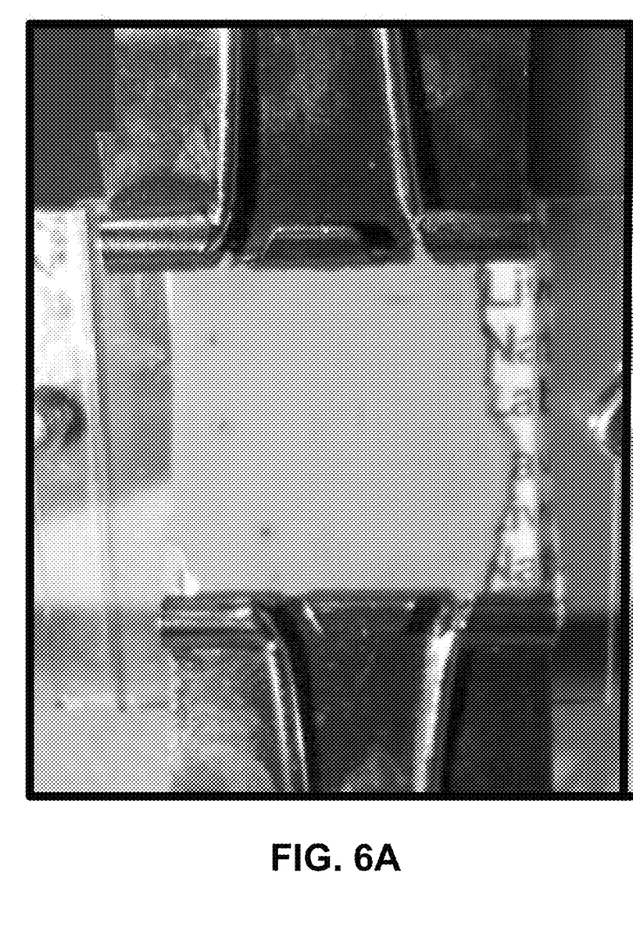
FIG. 6A is a depiction of a device with $Fe_2O_3/SiO_2$ colloidal nanoparticles in suspension in the absence of applied electrical field, according to one embodiment.
Figure 6B:
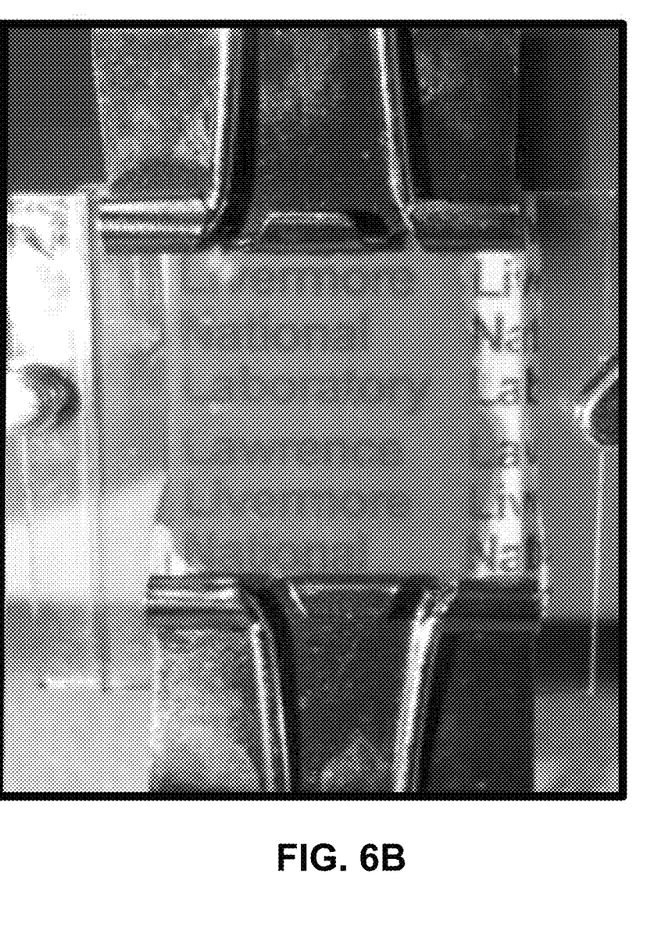
FIG. 6B is a depiction of a device with $Fe_2O_3/SiO_2$ colloidal nanoparticles in suspension in the presence of applied electrical field, according to one embodiment.

As shown in FIGS. 6A-6B, the transparency of the device using $Fe_2O_3/SiO_2$ nanoparticles in liquid suspension medium dramatically increases, as accompanied with the reflected color change, with increasing the applied voltage. The suspensions of $Fe_2O_3/SiO_2$ nanoparticles included $Fe_2O_3$ nanoparticle clusters with a core diameter of about 70 nm. FIGS. 6A-6B are photographs of $Fe_2O_3/SiO_2$ nanoparticle suspensions in a SPD with background text placed on the backside of the device. FIG. 6A shows the $Fe_2O_3/SiO_2$ nanoparticles in liquid suspension medium in the absence of applied electric field. FIG. 6B shows the $Fe_2O_3/SiO_2$ nanoparticles in liquid suspension medium in the presence of applied electric field. The background text placed on the backside of the device provides comparison of the transparency between the device without applied electric field (FIG.

6A) and the device with applied electric field (FIG. 6B). The observed color change (not apparent in black and white photo) from an orange color in the device without an applied electric field (FIG. 6A) to a pink color in the device with an applied electric field (FIG. 6B) results from a combination of colloidal particle arrangements which may result in structural colors along with the inherent pigmentary color of the $Fe_2O_3/SiO_2$ nanoparticles. Thus, the yellowish orange color (or deep-red color at higher voltage) is in combination of structural color of green (or near UV at higher voltage) and their pigmentary color (reddish orange color).

Figure 7A:
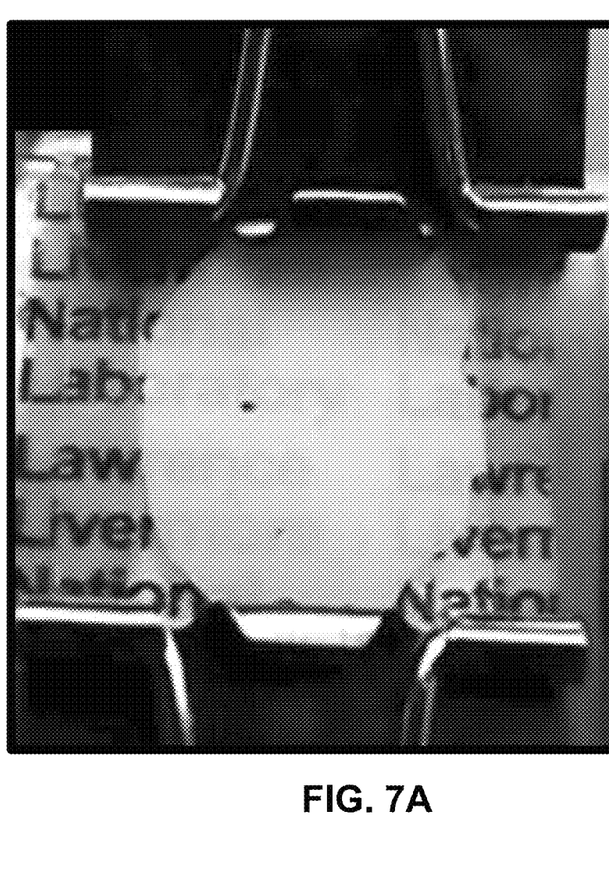
FIG. 7A is a depiction of a device with $ZnS/SiO_2$ colloidal nanoparticles in suspension in the absence of applied electrical field, according to one embodiment.
Figure 7B:
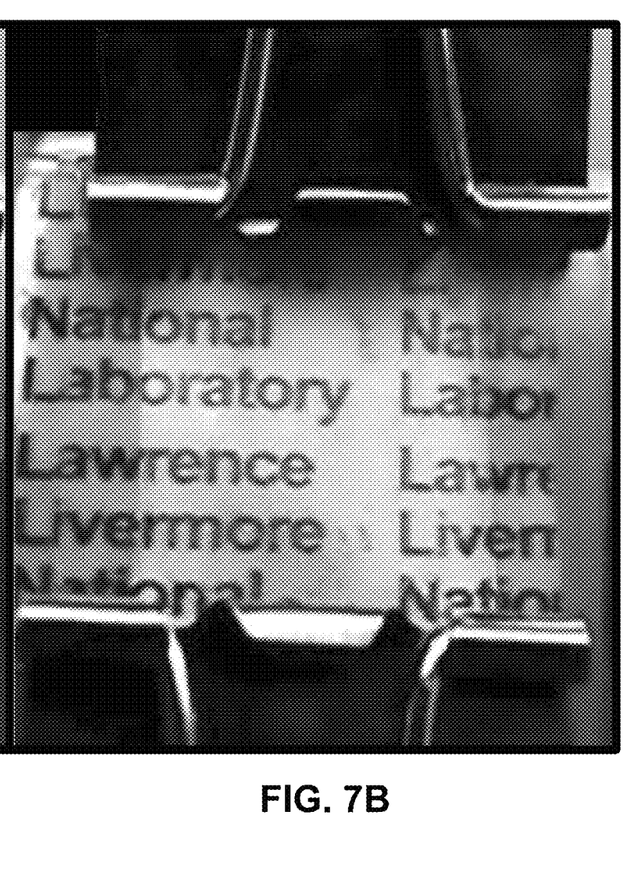
FIG. 7B is a depiction of a device with $ZnS/SiO_2$ colloidal nanoparticles in suspension in the presence of applied electrical field, according to one embodiment.

FIGS. 7A and 7B show that the transparency of the device using $ZnS/SiO_2$ colloidal nanoparticles in liquid suspension medium dramatically increases, as accompanied with the change from opaque to transparent, with increasing the applied voltage. The suspensions of $ZnS/SiO_2$ nanoparticles included ZnS nanoparticle clusters with a core diameter of about 60 nm. FIG. 7A shows the $ZnS/SiO_2$ nanoparticles in liquid suspension medium in the absence of applied electric field. FIG. 7B shows the $ZnS/SiO_2$ nanoparticles in liquid suspension medium in the presence of applied electric field. The device in the Off state (FIG. 7A) was opaque, but became completely transparent in the presence of applied field (FIG. 7B).

Figure 8A:
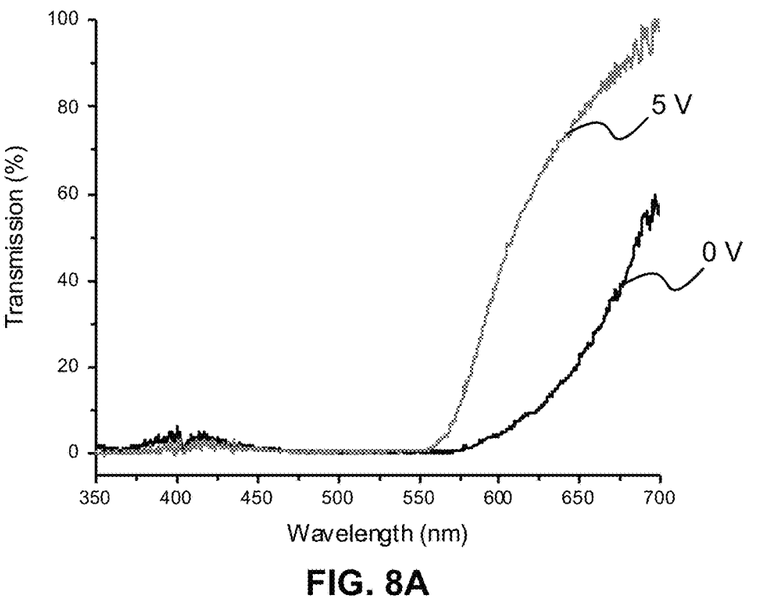
FIG. 8A is a graph of light transmission spectra of $Fe_2O_3/SiO_2$ colloidal nanoparticles in suspension in the presence and absence of applied electrical field, according to one embodiment.
Figure 8B:
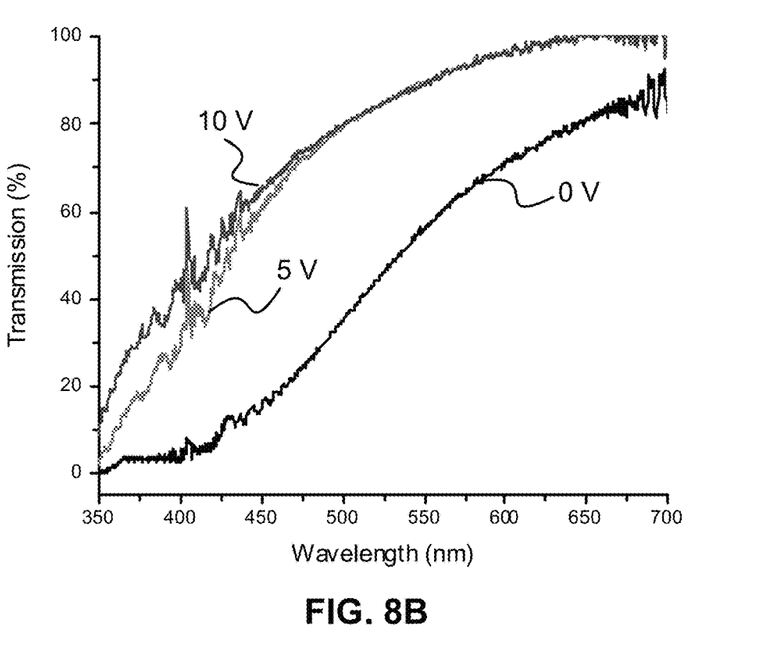
FIG. 8B is a graph of light transmission spectra of ZnS/SiO$_2$ colloidal nanoparticles in suspension in the presence and absence of applied electrical field, according to one embodiment.

Light Transmission Spectra of Colloidal Nanoparticle Suspensions with Increased Voltage FIGS. 8A and 8B show light transmittance vs wavelength data of the colloidal nanoparticle suspensions at different applied electrical fields. The y-axis represents Light Transmittance in which the percentage of light that passes through the sample as measured on an Ocean Optics HR2000+. The x-axis represents the spectrum of wavelengths measured for each sample.

FIG. 8A shows the transmittance vs wavelength for the $Fe_2O_3/SiO_2$ colloidal nanoparticle suspension as used in FIGS. 6A-6B with no applied electrical field (0 V, bottom curve), and with an applied electrical field of 5 V (top curve). At wavelengths lower than 550 nm, the light may not be transmitted due to inherent absorption properties of $Fe_2O_3/SiO_2$ nanoparticles. At wavelengths greater than 550 nm, the applied electrical field had increased the transmittance of light through the $Fe_2O_3/SiO_2$ colloidal nanoparticle suspension, reaching greater than 90% transmittance at the wavelengths greater than 650 nm.

FIG. 8B shows the transmittance as a function of the wavelength for the $ZnS/SiO_2$ colloidal nanoparticle suspension as used in FIGS. 7A-7B at different applied electrical fields. The bottom curve represents no applied electrical field (0 V). The middle curve represents an applied electrical field of 5 V. The upper curve represents an applied electrical field of 10 V. FIG. 8B illustrates interparticle distance can be controlled by the amount of potential applied to the electrode. Applying 5 V caused an increase in light transmittance in the 350 nm to 700 nm range which indicated the $ZnS/SiO_2$ particle arrangement were closer together and more ordered. At 10 V, there was a further increase of light transmittance in the range of 350 nm to 700 nm, thereby illustrating that the $ZnS/SiO_2$ particles were even closer together and more ordered.

In Use

The various embodiments described herein present a product that is capable of tuning the transparency in response to electric field for versatile and multifunctional smart windows and display technologies. Moreover, some embodiments describe an ideal particle size and size distribution for the generation of electrical tunable structural color and transparency for smart windows and refractive display, electronic ink (E-ink), E films, and electrophoretic display devices.

Furthermore, color generation resulting from combination of colloidal particle arrangements may give rise to structural colors, along with inherent pigmentary colored nanoparticles, for useful and refractive displays, The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A product, comprising:
   a mixture comprising a solvent and generally spherical colloidal nanoparticles, the colloidal nanoparticles each having a core and a shell surrounding the core; and
   an electrode,
   wherein the mixture is characterized as having a transparency to light in a predetermined wavelength range,
   wherein the transparency increases as a voltage of the electrode increases.

2. The product of claim 1, wherein the colloidal nanoparticles migrate toward one side of the mixture upon application of the voltage to the electrode.

3. The product of claim 1, wherein at least one electrode is transparent.

4. The product of claim 1, wherein at least some of the cores are light emitting.

5. The product of claim 1, wherein at least some of the cores include a colorant applied to a base material of the cores.

6. The product of claim 1, wherein a color hue of the mixture changes as the transparency changes.

7. The product of claim 1, wherein the mixture is characterized as having a transparency of at least 90% light transmission upon application of a predetermined voltage to the electrode.

8. The product of claim 1, wherein the predetermined wavelength range is only a portion of the wavelengths in the ultraviolet to infrared range, wherein the transparency of the mixture does not significantly change for a second wavelength range in the ultraviolet to infrared range as the voltage of the electrode increases.

9. The product of claim 1, wherein the shell is silicon-based.

10. The product of claim 1, wherein the shell has a positive charge.

11. The product of claim 1, wherein the shell has a negative charge.

12. The product of claim 1, wherein the solvent is a polar solvent, wherein a boiling point of the solvent is greater than about 150 degrees Celsius.

13. The product of claim 1, further comprising at least one spacer forming a chamber having sides defining an interior, wherein the mixture is in the interior of the chamber.

14. The product of claim 1, the mixture having a specific color, the mixture being characterized as changing color across the visible spectrum in direct correlation to a concentration of the nanoparticles wherein a concentration of the nanoparticles is selected to provide the specific color of the mixture.

15. The product of claim 14, wherein changing the concentration of the nanoparticles changes the color of the mixture across a visible spectrum.

16. A product, comprising:
    a plurality of generally spherical colloidal nanoparticles each having a core and a shell surrounding the core,
    wherein at least some of the cores include a colorant applied to a base material of the cores.

17. The product of claim 16, wherein the nanoparticles have an average diameter in a range of about 50 to about 200 nanometers.

18. The product of claim 16, wherein at least some of the cores are light emitting.

19. The product of claim 16, wherein the core is light absorbing in selected regions of the electromagnetic spectrum.

20. The product of claim 16, wherein the core is light reflecting in selected regions of the electromagnetic spectrum.

21. The product of claim 16, wherein the core is silicon-based.

22. The product of claim 16, wherein the shell has a positive charge.

23. The product of claim 16, wherein the shell has a negative charge.

24. The product of claim 1, wherein a concentration of the generally spherical colloidal nanoparticles in the mixture is in a range of about 5 to about 30 weight % in the mixture.

25. The product of claim 2, wherein the mixture is physically characterized as having a greater relative transparency when the colloidal nanoparticles are migrated toward the one side of the mixture upon application of the voltage to the electrode.

26. The product of claim 1, wherein the mixture is characterized as having a random particle structure in an absence of an applied voltage.

* * * * *